(12) United States Patent
Boigas

(10) Patent No.: US 10,836,507 B2
(45) Date of Patent: Nov. 17, 2020

(54) AIRCRAFT COMMUNICATION NETWORK

(71) Applicant: Safran Aerotechnics, Plaisir (FR)

(72) Inventor: Patrick Boigas, Jouars Ponchartrain (FR)

(73) Assignee: Safran Aerotechnics, Plaisir (FR)

( * ) Notice: Subject to any disclaimer, the term of this patent is extended or adjusted under 35 U.S.C. 154(b) by 326 days.

(21) Appl. No.: 15/012,942

(22) Filed: Feb. 2, 2016

(65) Prior Publication Data

US 2016/0221687 A1 Aug. 4, 2016

(30) Foreign Application Priority Data

Feb. 2, 2015 (FR) ...................... 15 50768

(51) Int. Cl.
| | |
|---|---|
| *B64D 47/08* | (2006.01) |
| *B64D 11/00* | (2006.01) |
| *H04N 7/18* | (2006.01) |
| *H04L 29/08* | (2006.01) |
| *H04N 5/247* | (2006.01) |

(52) U.S. Cl.
CPC .......... *B64D 47/08* (2013.01); *B64D 11/0015* (2013.01); *H04L 67/12* (2013.01); *H04N 5/247* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 8,127,333 B2 | 2/2012 | Weidel | |
| 9,643,722 B1* | 5/2017 | Myslinski | ............ G05D 1/0094 |
| 2002/0093564 A1 | 7/2002 | Israel | |
| 2002/0167408 A1* | 11/2002 | Trajkovic | ............... G06Q 30/06 |
| | | | 340/573.1 |
| 2009/0288123 A1* | 11/2009 | Havlovick | ......... B64D 11/0624 |
| | | | 725/77 |
| 2010/0060739 A1* | 3/2010 | Salazar | ............. B64D 11/0624 |
| | | | 348/148 |
| 2010/0195634 A1* | 8/2010 | Thompson | .......... H04W 36/385 |
| | | | 370/338 |
| 2014/0218544 A1 | 8/2014 | Senot et al. | |

OTHER PUBLICATIONS

FR Patent Application 1550768, Search report dated Nov. 5, 2015, 7 pgs.

* cited by examiner

*Primary Examiner* — Dakshesh D Parikh
(74) *Attorney, Agent, or Firm* — Kilpatrick Townsend & Stockton LLP

(57) ABSTRACT

An aircraft communication network comprises in-flight entertainment terminals, an addressing system, communication links and one or more cameras intended for installation inside the aircraft. A passenger can thus receive on their in-flight entertainment terminal, images captured by one of the cameras or data deduced from the images. Said images or data inform him of crowding in common access areas or shared use areas inside the aircraft.

11 Claims, 2 Drawing Sheets

AIRCRAFT COMMUNICATION NETWORK

CROSS REFERENCE TO RELATED APPLICATION

The present application claims the benefit of French Patent Application No. 1550768 filed Feb. 2, 2015, the contents of which are incorporated herein by reference in their entirety.

TECHNICAL FIELD OF THE INVENTION

The present invention relates to an aircraft communication network, and an aircraft equipped with such a communication network.

BACKGROUND OF THE INVENTION

A communication network for an aircraft cabin, such as it exists to date, comprises:
in-flight entertainment terminals, intended for individual use by passengers of the aircraft;
an addressing system; and
communication links connecting the terminals and the addressing system.

Such networks are used in particular for making a library of films or games available to each passenger, and/or for communicating information on the progress and conditions of the flight to them. To this end, the addressing system can comprise one or more servers and/or switches.

Based on this situation, a purpose of the present invention consists of providing each passenger with assistance to facilitate their movements inside the aircraft, by using the internal communication network of the aircraft.

An additional purpose of the invention can be to reduce congestion in the aisles inside the aircraft by avoiding passengers unnecessarily entering areas of the aircraft that are already crowded.

Another purpose of the invention can be to reduce the movements of the cabin crew in the aircraft.

SUMMARY OF THE INVENTION

In order to achieve at least one of these, or other, purposes, a first aspect of the invention proposes a communication network as described above, but comprising in addition at least one camera intended for installation inside the aircraft, so that an optical field of this camera comprises a general access area or a shared use area inside the aircraft. The camera is connected to the communication links of the network, and each in-flight entertainment terminal is adapted to receive a command from the corresponding passenger, then to forward the command to the addressing system, and the addressing system is adapted to send, in response to the command, at least one data item resulting from at least one image acquisition carried out by the camera, via the communication links, to the in-flight entertainment terminal that received the command, and this in-flight entertainment terminal is adapted to communicate the data item to the corresponding passenger.

In other words, the internal communication network of the aircraft is supplemented by at least one camera, also inside the aircraft, in order to communicate information on the camera area to the passenger who requests it. It is thus possible for the passenger to be aware of a state of congestion or crowding of certain areas of the aircraft, and to plan their movements in accordance with this information. Thus unnecessary movement of passengers can be avoided.

In particular embodiments of the invention, each in-flight entertainment terminal may comprise a screen, and the data sent by the addressing system in response to the command may comprise at least one extract from the image acquired by the camera. The in-flight entertainment terminal is thus adapted to display on the screen at least this image extract. In this case, the network may also comprise at least one filter unit, connected so as to be activated for each image extract sent to one of the in-flight entertainment terminals, the filter unit being adapted to search for a face or a human silhouette within the image extract, and to replace this face or human silhouette with masking or blurring in the image extract as displayed on the screen. The use of such filtering makes it possible to comply with the legislation in force in certain countries concerning respect for private life and personal image rights.

In preferred embodiments of the invention, the network may also comprise a counting unit, connected in such a way as to be activated for each image that is processed in response to a command received by one of the in-flight entertainment terminals, this counting unit being arranged to count people who are present in the image and send a counting result to the in-flight entertainment terminal as a data item resulting from the image acquisition. The in-flight entertainment terminal is then adapted to communicate this counting result to the corresponding passenger. Information on the crowding existing in the area served by the camera is thus delivered directly in the form of a number of passengers present in this area. When an access area to a bar, refreshments counter or toilets inside the aircraft is concerned, the passenger thus knows the length of the queue.

Possibly, the network may comprise several cameras intended for installation inside the aircraft, so that an optical field of each camera comprises a general access area or a shared use area inside the aircraft that is different from the area comprised within the optical field of each of the other cameras. In this case, each camera is connected to the communication links of the network so that at least one data item resulting from at least one image acquisition carried out by any one of the cameras is sent to the in-flight entertainment terminal that has received a command relating to that camera. Then, in such an implementation using several cameras, the in-flight entertainment terminal is adapted to communicate each data item to the passenger, together with an indication of the area inside the aircraft where the camera from which this data item originates is installed. For example, each in-flight entertainment terminal may comprise a screen, and be adapted to display at least part of an interior plan of the aircraft, and to display each data item together with a location on the plan of the area served by the camera from which the data item originates.

The network may also comprise at least one monitoring terminal that is intended for a member of the aircraft crew, and connected to the network communication links so that at least one data item resulting from at least one image acquisition that has been carried out by any one of the cameras is sent to the monitoring terminal. The monitoring terminal is then adapted to communicate the data item to the crew member. The crew member can thus have available an item of information equivalent to that which is accessible to each passenger, concerning crowding and congestion of the different areas inside the aircraft.

Possibly, each in-flight entertainment terminal may also be adapted to receive a call command, and the communications links are adapted to send the call command to the monitoring terminal, the latter being adapted to communicate the call command to the crew member, and the network being adapted to establish a bidirectional communication session between an in-flight entertainment terminal that has received a call command and the monitoring terminal that is the addressee of this call command. Thus, the passenger can ask a crew member a question without the need for either of them to move for this question. The crowding in the aisles of the aircraft is thus reduced. Preferably, the communication network may be adapted so that the bidirectional communication session between the in-flight entertainment terminal that has received the call command and the monitoring terminal that is the addressee of that call command comprises audio streams, the in-flight entertainment terminal and the monitoring terminal each being provided with a microphone and at least one earphone. Communication between the passenger and the crew member is thus facilitated and more natural. Optionally, the communication session may also comprise video streams when both terminals are equipped with local cameras and screens.

A second aspect of the invention proposes an aircraft equipped with a communication network according to the first aspect. Each common access area or shared use area that is served by one of the cameras may thus be selected from an access area to a bar, a waiting area for a counter for refreshments or the sale of various articles, a relaxation area, passenger aisle, an entrance area, an intermediate area between two sections of the cabin, and a waiting area for the toilets, washroom or baby change.

BRIEF DESCRIPTION OF THE FIGURES

Other features and advantages of the present invention will become apparent from the following description of non-limitative embodiments, with reference to the attached drawings, in which.

For clarity sake, the dimensions of the elements represented in these figures do not correspond either to actual dimensions or to actual dimensional relationships. Moreover, identical references that are given in different figures denote identical elements, or elements with identical functions.

DETAILED DESCRIPTION OF THE INVENTION

Figure 1:
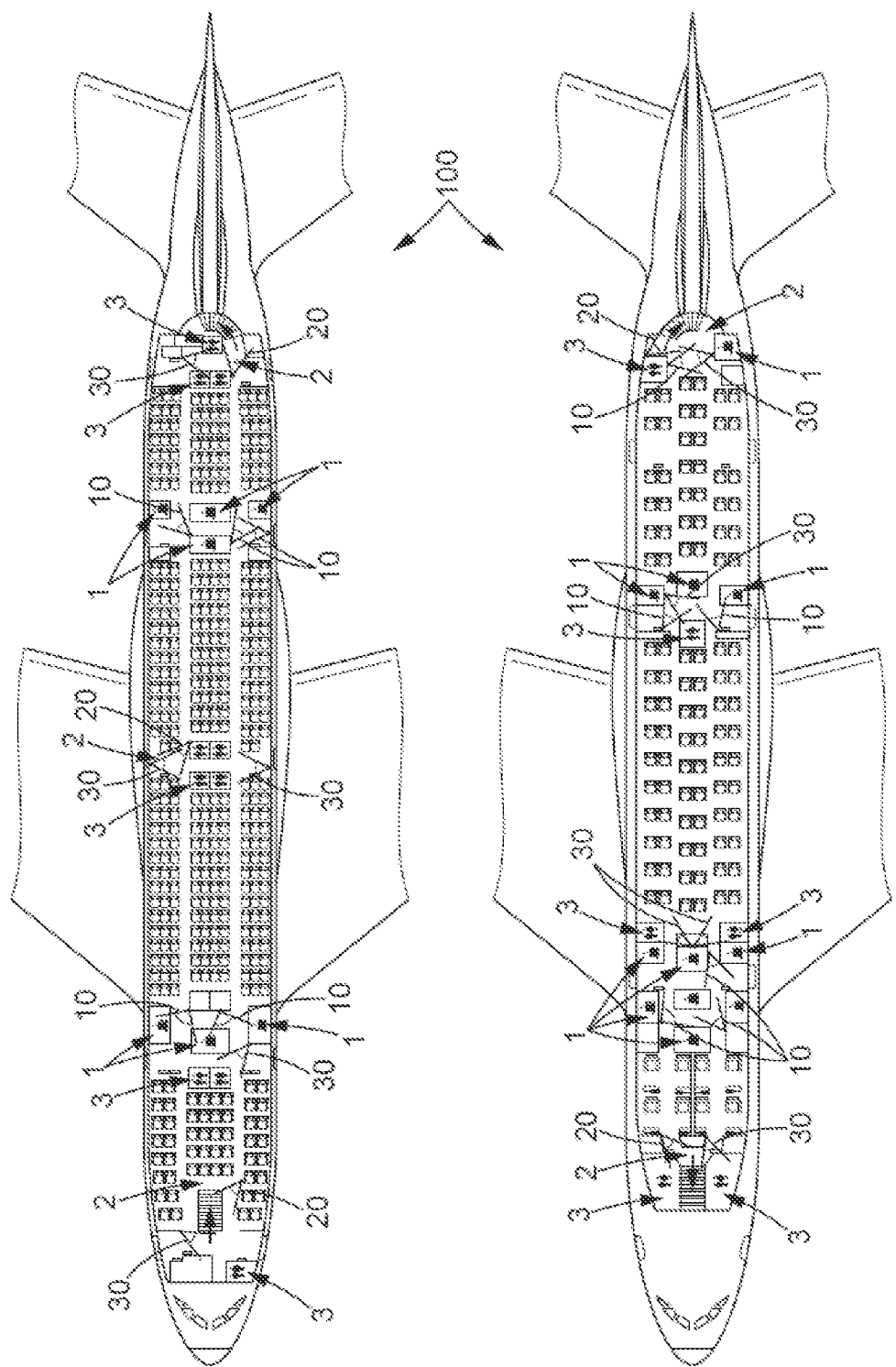
FIG. 1 is an elevation view of an interior plan of an aircraft with two levels.

Application of the invention to an aircraft with two levels, or two decks, according to FIG. 1 is taken as an example, but it is understood that the invention can be applied to any aircraft transporting passengers, regardless of the size of the aircraft, including single-deck aircraft.

The references given in FIG. 1 have the following meanings:

100 the entire aircraft
1 bars or counters for refreshments or the sale of various articles
2 relaxation areas, passenger aisles, entrance areas or intermediate areas between two cabins
3 toilets, washroom or baby change
10 cameras dedicated to the areas of the bars or the counters for refreshments or the sale of various articles
20 cameras dedicated to the relaxation areas, passenger aisles, entrance areas or intermediate areas between two cabins
30 cameras dedicated to the waiting areas for the toilets, washrooms or baby change The aircraft 100 is equipped with an internal communication network that comprises an in-flight entertainment terminal associated with each passenger seat, and an addressing system that make it possible to send entertainment programs, films, games, information on the progress of the flight, etc., individually to each in-flight entertainment terminal. The internal communications network also comprises, in a known manner, communication links and one or more communication servers and/or communication switches for selecting and sending the entertainment or information data, in accordance with selection commands inputted by each passenger separately on their in-flight entertainment terminal. Also in a known manner, each in-flight entertainment terminal comprises at least one display screen, earphones and command input means that may be touch-sensitive areas on the screen, dedicated buttons, a keyboard, etc.

Each of the cameras 10-30 may be adapted to capture images in the visible spectral range, or in the near infra-red spectral range, or even in the thermal infra-red spectral range. Optionally, each camera may be adapted to capture spectral images simultaneously in several of these spectral ranges, and combination images are then constructed, resulting from combinations of several spectral images that have been captured simultaneously for the same optical field but for different spectral ranges. The use of such combination or multispectral images makes it possible in particular to reduce a probability of false detection of people while retaining natural colour information.

The cameras 10-30 are installed in the aircraft 100 to capture images of the common access areas or the shared use areas 1 to 3. Each camera is oriented to contain within its optical field at least a part of the corresponding area, so that the images captured show any passengers who may be present in this area. Thus, displaying the images that are captured by each camera provides information on crowding in the corresponding area, or on the availability of the facility to which the area is dedicated. For clarity sake, cameras 10-30 are shown in FIG. 1 in the form of angular sectors corresponding to the optical fields of these cameras.

Thus before leaving their seat to access any area of their choice inside the aircraft 100, each passenger can query their in-flight entertainment terminal in order to display the images captured by one or more of the cameras 10-30. To this end, the passenger inputs a dedicated command on the terminal, and the images captured by one or more of the cameras can appear in real time on the terminal screen. These images showing the crowding and the states of the queues for the facilities and services available in the aircraft allow the passenger to select the area of facilities or services for which the wait is shortest. Optionally, the images may motivate the passenger to delay moving within the aircraft if the crowding displayed is too great. The images from the cameras 20 can help the passenger to select the least congested route inside the aircraft for access to the area of the desired facility or service.

In first embodiments of the invention, images from a single one of the cameras 10-30 are displayed for a period on the screen of the in-flight entertainment terminal, and the command inputted by the passenger on his in-flight entertainment terminal selects the camera the images from which are displayed.

In other embodiments of the invention, the screen of the in-flight entertainment terminal may be divided into several windows, and the images captured by several of the cameras 10-30 are displayed simultaneously in windows that are allocated respectively to the cameras. In this case, an indication of each area in the aircraft that is displayed separately in a window may be added to the images, so that the passenger can easily identify this area.

In such embodiments of the invention, the data sent by the addressing system to the in-flight entertainment terminal are directly the images captured by the cameras. However, legislation in force in certain countries may restrict the right of each passenger to display the other passengers of the aircraft in this way. In this case, each image may be processed between its capture by one of the cameras and its display on the screen of one of the in-flight entertainment terminals, in order to prevent each face or each silhouette being recognized. Such intermediate processing may be carried out by a face or human silhouette recognition unit, which can proceed in particular by searching for characteristic points in each image, then blurring or masking is superimposed locally on each image displayed, at the location of the face or of each silhouette. Such blurring or masking is selected in order to comply with respect for private life and personal image rights, while supplying information on the presence of passengers in the desired area, with the number thereof.

In alternative embodiments of the invention, the data sent by the addressing system to the in-flight entertainment terminal may result from a processing of the images captured by the cameras. For example, a systematic search is carried out in each image for the presence of faces or human silhouettes, and the number of people present in the optical field of each camera is determined from the separate faces or silhouettes detected in each image. This number may then itself be sent to the in-flight entertainment terminal on which the command was inputted. For example, a plan of the aircraft may be displayed on the terminal screen, and the numbers of people are displayed in inserts visually linked to the places on the plan that correspond to the relevant areas inside the aircraft. Optionally, the numbers of people may be replaced for the display by other more visual modes of representation or indication, for example based on logos.

In preferred embodiments of the invention, the communication network comprises in addition one or more supplementary terminals intended for members of the aircraft crew, in particular in order to allow monitoring of the movements and activity in the cabin. For this reason, these supplementary terminals have been called monitoring terminals in the general part of the description. These monitoring terminals may be provided with the same functionalities as the in-flight entertainment terminals, for displaying the images captured by the cameras 10-30, or the information and data deduced from these images. However, for the monitoring terminals, there may be no need for a command to be inputted by the crew member for the images or the data deduced therefrom to be displayed.

An additional, optional, functionality of the communication network according to the invention consists of allowing a communication between a crew member at one of the monitoring terminals and a passenger at one of the in-flight entertainment terminals. Such a communication may be initiated by the passenger, by inputting a call command on their terminal. This call command is sent to the monitoring terminal by the internal communication links of the aircraft, so that the crew member can reply to the passenger's questions. To this end, a bidirectional communication session, preferably full-duplex, is established between the two terminals in order to allow an exchange of questions and answers between the crew member and the passenger. Preferably, both terminals may be equipped with microphones as well as earphones, in order to allow speech transmission. Thus, audio streams can be sent in both directions via the communications network between the two terminals. Possibly, video streams can also be sent simultaneously between the two terminals that are each equipped with local cameras, and/or the initial call command can be produced alternatively by the crew member from the monitoring terminal, by selecting the desired passenger terminal.

Figure 2:
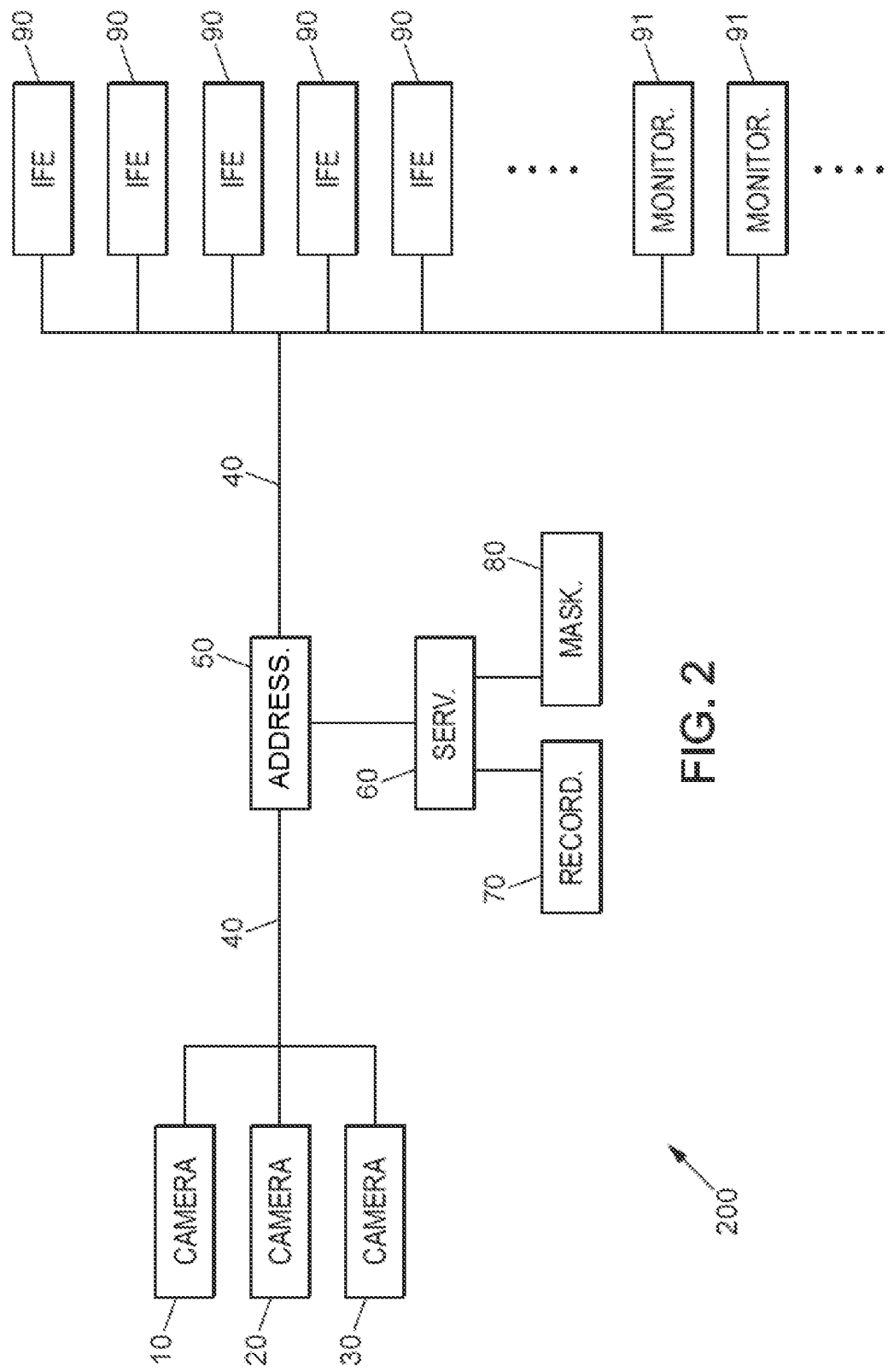
FIG. 2 is a diagram showing certain elements of an aircraft communications network, according to the invention.

The references given in the diagram in FIG. 2 have the following meanings:
- 200 the entire communication network
- 10-30 the cameras already introduced
- 40 the communication links
- 50 the addressing or switching command unit, marked ADDRESS.
- 60 server, marked SERV.
- 70 video recorder, marked RECORD., for recording the images captured by the cameras 10-30
- 80 filtering unit, marked MASK., for searching for the faces or the silhouettes of passengers who are present in each image captured by one of the cameras 10-30, and for locally superimposing blurring or masking on the image at the location of each face or silhouette
- 90 the in-flight entertainment terminals, marked IFE
- 91 monitoring terminals, marked MONITOR.

Obviously, the topology of the communication network 200 shown in FIG. 2 is intended as an example only, and can be replaced by any other network topology according to the addressing and communication mode used.

Possibly, the filtering unit 80 may incorporate a counting unit (not shown), for counting the different faces or human silhouettes found by the filtering unit within each image. The result of the count may be sent to one of the in-flight entertainment terminals 90 on which a command has been inputted by a passenger, and/or optionally to one of the monitoring terminals 91.

Also possibly, certain elements of the communications network 200 may be shared with a cabin video monitoring system (denoted by the acronym CVMS) as already used in some aircraft, and described for example in the U.S. Pat. No. 8,127,333.

Furthermore, an electrical energy supply socket, for supplying the power necessary for the operation of at least some elements of the network 200, may be provided for connecting the network to a power source external to the aircraft 100. Thus, the network 200 can be used when the aircraft 100 is on the apron and passengers are already on board, without causing excessive power consumption with respect to the capacity of the independent electricity generation system of the aircraft which is then activated.

Finally, the communication network 200 may be equipped with a data transfer port, intended to be connected to a display unit that is external to the aircraft 100. In this way, the images captured by the cameras 10-30 can also be accessed by an authorized agent, from a station situated outside the aircraft 100. Such a possibility of display from outside the aircraft may be useful for purposes of security or managing the embarkation or disembarkation of the passengers.

It is understood that the invention can be reproduced while modifying some of its secondary aspects with respect to the description that has just been given. For example, the communication links of the internal network of the aircraft can be wired or according to a wireless transmission mode, for example of the WiFi type. Finally, the invention is compatible with multiple methods of displaying on in-flight entertainment terminals the data that are deduced from the images captured by the cameras.

The invention claimed is:

1. Communication network for an aircraft cabin comprising:
    in-flight entertainment terminals, intended for individual use by passengers of the aircraft;
    an addressing system;
    communication links connecting the in-flight entertainment terminals and the addressing system,
        at least one camera installed inside the aircraft cabin, so that an optical field of the camera comprises at least a part of a common access area or a shared use area inside the aircraft cabin, the camera being connected to the communication links of the communication network,
        wherein each in-flight entertainment terminal is adapted to receive a command from a passenger, to forward the command to the addressing system, and wherein the addressing system is adapted to send, in response to the command, at least one data item resulting from at least one image acquisition carried out by the camera, via the communication links to the in-flight entertainment terminal that received the command from the passenger, wherein the in-flight entertainment terminal is adapted to communicate the data item to the passenger, in order to facilitate each passenger displacement in the aircraft cabin,
        wherein each in-flight entertainment terminal comprises a screen, and the data sent by the addressing system in response to the command, comprises at least one extract from the image acquired by the camera, and the in-flight entertainment terminal is adapted to display on the screen at least the extract of the image, and
        at least one filtering unit, connected so as to be activated for each image extract that is sent to one of the in-flight entertainment terminals, the filtering unit adapted to search for a face within the image extract, and to replace the face with masking or blurring in the image extract as displayed on the screen, and
        a counting unit, arranged so as to be activated for each image that is processed in response to a command received by one of the in-flight entertainment terminals, the counting unit adapted to count people who are present in the image and send a counting result to the in-flight entertainment terminal as a data item resulting from the image acquisition, wherein the in-flight entertainment terminal is adapted to communicate the counting result to the passenger.

2. Communication network according to claim 1, comprising several cameras intended for installation inside the aircraft, so that an optical field of each camera comprises at least part of a common access area or a shared use area inside the aircraft, that is different from the area comprised in the optical field of each of the other cameras;
    each camera being connected to the communication links of the communication network so that at least one data item resulting from at least one image acquisition that has been carried out by any one of the cameras is sent to each in-flight entertainment terminal that has received a command relating to that camera;
    and the in-flight entertainment terminal is adapted to communicate each data item to the passenger, together with an indication of the area inside the aircraft where the camera from which said data item originates is installed.

3. Communication network according to claim 2, in which each in-flight entertainment terminal comprises a screen, and is adapted to display at least part of an interior plan of the aircraft, and to display each data item together with a location on the plan of the area corresponding to the camera from which said data item originates.

4. Communication network according to claim 1, also comprising at least one monitoring terminal that is intended for a crew member of the aircraft, and connected to the communication links of the communication network so that at least one data item resulting from at least one image acquisition that has been carried out by any one of the cameras is sent to the monitoring terminal;
    and the monitoring terminal is adapted to communicate the data item to the crew member.

5. Communication network for an aircraft cabin comprising:
    in-flight entertainment terminals, intended for individual use by passengers of the aircraft;
    an addressing system;
    communication links connecting the in-flight entertainment terminals and the addressing system,
    at least one camera installed inside the aircraft cabin, so that an optical field of the camera comprises at least a part of a common access area or a shared use area inside the aircraft cabin, the camera being connected to the communication links of the communication network,
    wherein each in-flight entertainment terminal is adapted to receive a command from a passenger, to forward the command to the addressing system, wherein the addressing system is adapted to send, in response to the command, at least one data item resulting from at least one image acquisition carried out by the camera, via the communication links to the in-flight entertainment terminal that received the command from the passenger, wherein the in-flight entertainment terminal is adapted to communicate the data item to the passenger, in order to facilitate each passenger displacement in the aircraft cabin,
    wherein each in-flight entertainment terminal comprises a screen, and the data sent by the addressing system in response to the command, comprises at least one extract from the image acquired by the camera, wherein the in-flight entertainment terminal is adapted to display on the screen at least the extract of the image,
    at least one filtering unit, connected so as to be activated for each image extract that is sent to one of the in-flight entertainment terminals, the filtering unit adapted to search for a face or a human silhouette within the image extract, and to replace the face or human silhouette with masking or blurring in the image extract as displayed on the screen;
    at least one monitoring terminal that is intended for a crew member of the aircraft, connected to the communication links of the communication network so that at least one data item resulting from at least one image acquisition that has been carried out by any one of the cameras is sent to the monitoring terminal;
    wherein the monitoring terminal is adapted to communicate the data item to the crew member,
    in which each in-flight entertainment terminal is also adapted to receive a call command, and the communication links are adapted to forward said call command to the monitoring terminal, said monitoring terminal being adapted to communicate the call command to the crew member, and the network is adapted to establish a bidirectional communication session between an in-flight entertainment terminal that has received a call command and the monitoring terminal that is the addressee of said call command.

6. Communication network according to claim 5, adapted so that the bidirectional communication session between the in-flight entertainment terminal that has received a call command and the monitoring terminal that is the addressee of said call command comprises audio streams, said in-flight entertainment terminal and said monitoring terminal each being provided with a microphone and at least one earphone.

7. Aircraft equipped with a communication network according to claim 1.

8. Aircraft according to claim 7, in which the common access area or shared use area that is served by a camera comprises a waiting area for toilets, washroom or baby change area.

9. Communication network for an aircraft cabin comprising:
   in-flight entertainment terminals, intended for individual use by passengers of the aircraft;
   an addressing system;
   communication links connecting the in-flight entertainment terminals and the addressing system,
      at least one camera installed inside the aircraft cabin, so that an optical field of the camera comprises at least a part of a common access area or a shared use area inside the aircraft cabin, the camera being connected to the communication links of the communication network,
      wherein each in-flight entertainment terminal is adapted
   to receive a command from a passenger,
   then to forward said command to the addressing system, and
   the addressing system is adapted to send, in response to the command, at least one data item resulting from at least one image acquisition carried out by the camera, via the communication links to the in-flight entertainment terminal that received the command from the passenger, wherein the in-flight entertainment terminal is adapted to communicate the data item to the passenger, in order to facilitate each passenger displacement in the aircraft cabin,
   a counting unit, arranged so as to be activated for each image that is processed in response to a command received by one of the in-flight entertainment terminals, the counting unit adapted to count people who are present in the image and send a counting result to the in-flight entertainment terminal as a data item resulting from the image acquisition, and the in-flight entertainment terminal is adapted to communicate the counting result to the passenger, and
   wherein each in-flight entertainment terminal is also adapted to receive a call command, and the communication links are adapted to forward the call command to a monitoring terminal, the monitoring terminal adapted to communicate the call command to the crew member, the network adapted to establish a bidirectional communication session between an in-flight entertainment terminal that has received a call command and the monitoring terminal that is the addressee of the call command.

10. Communication network according to claim 9, wherein each in-flight entertainment terminal comprises a screen, and the data sent by the addressing system in response to the command, comprises at least one extract from the image acquired by the camera, and the in-flight entertainment terminal is adapted to display on the screen at least the extract of the image.

11. Communication network according to claim 9, wherein each in-flight entertainment terminal comprises a screen, and is adapted to display at least part of an interior plan of the aircraft, and to display each data item together with a location on the plan of the area corresponding to the camera from which the data item originates.

* * * * *